United States Patent
Rottmerhusen

[11] Patent Number: 5,856,731
[45] Date of Patent: Jan. 5, 1999

[54] ELECTRIC SCREWDRIVER

[75] Inventor: Hermann Rottmerhusen, Tellingstedt, Germany

[73] Assignee: Metabowerke GmbH & Co., Nurtingen, Germany

[21] Appl. No.: 765,778
[22] PCT Filed: Oct. 5, 1995
[86] PCT No.: PCT/EP95/03923
  § 371 Date: Jan. 14, 1997
  § 102(e) Date: Jan. 14, 1997
[87] PCT Pub. No.: WO96/11525
  PCT Pub. Date: Apr. 18, 1996

[30] Foreign Application Priority Data
  Oct. 5, 1994 [DE] Germany .......................... 44 35 558.0
  Feb. 7, 1995 [DE] Germany ......................... 195 03 956.4
[51] Int. Cl.[6] ............................................ H02P 7/638
[52] U.S. Cl. ............................................ 318/245; 318/244
[58] Field of Search ................................. 318/599, 244, 318/245, 246

[56] References Cited

U.S. PATENT DOCUMENTS

| | | |
|---|---|---|
| 3,319,152 | 5/1967 | Pinckaers . |
| 3,443,124 | 5/1969 | Pinckaers . |
| 3,633,094 | 1/1972 | Clements . |
| 3,944,909 | 3/1976 | Reymond . |
| 4,020,402 | 4/1977 | Storm . |
| 4,046,991 | 9/1977 | Sefton et al. . |
| 4,864,212 | 9/1989 | Parker . |

FOREIGN PATENT DOCUMENTS 4130532 3/1993 Germany .

OTHER PUBLICATIONS

"Burst–fire Control for Regulating Power of Electrical Machines", Radio Fernsehen Elektronik, 33 (1984) Jun., No. 6, East Berlin, GDR.

*Primary Examiner*—Bentsu Ro
*Attorney, Agent, or Firm*—Charles E. Baxley, Esq.

[57] ABSTRACT

A universal motor which operates an electric tool is controlled by a phase-gating controller for determining variable rotational speeds. The phase-gating controller can be switched over to wave-packet-controlled phase-gating control mode in order to be able to switch over between a continuous speed-torque characteristic and pulsating operation.

13 Claims, 3 Drawing Sheets

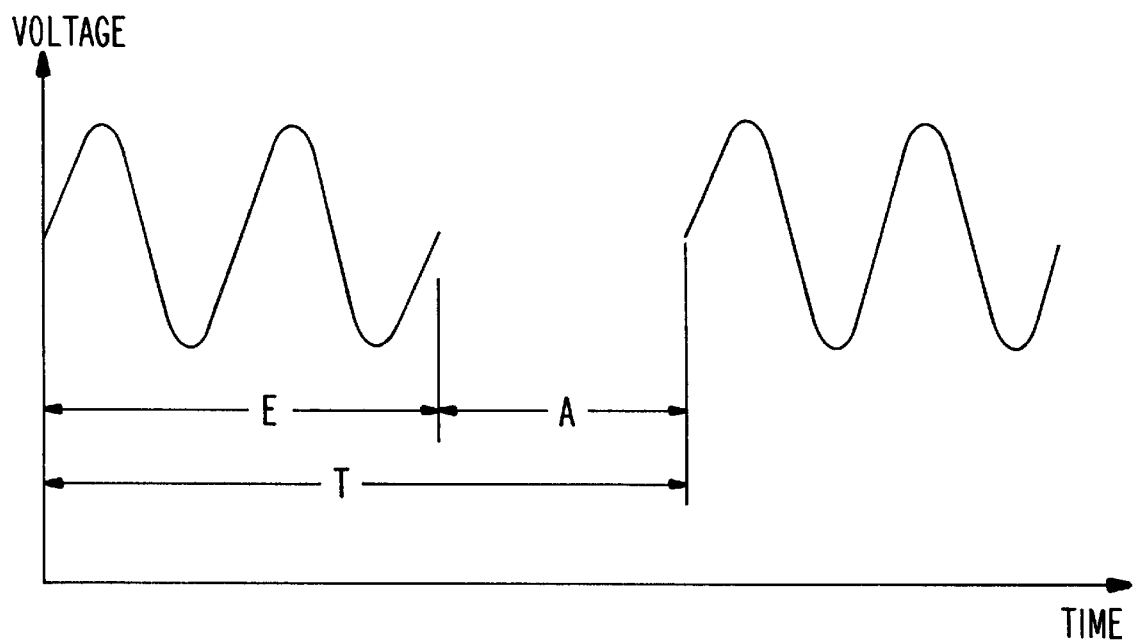

ELECTRIC SCREWDRIVER

This application is a National Stage of International Application PCT/EP95/03 923 under 35 USC § 371, filed Oct.5, 1995.

BACKGROUND OF INVENTION

The present invention relates generally to the field of electric screwdrivers and, more particularly, to an electric screwdriver, or tool, which is operated by an AC universal motor and which incorporates a phase-gating controller.

In phase-gating controllers, according to the prior art, each half wave of the AC voltage is used either as a full wave or as a phase-gated wave, in order to achieve operation which is as uniform as possible and has a continuous speed characteristic.

Known electric screwdrivers are equipped with this type of controller. The use of continuous rotational speeds when screws, used in the construction of buildings or the like, are being driven home lead to ejection forces on the screwdriver which have to be counteracted manually. It is extremely difficult to drive building screws home flush in a continuous fashion. The incorporation of a pre-selected value of torque to overcome this problem is not practical for fasteners in wood materials or on wood structures, since virtually every screwing operation requires a different torque.

It is also known to provide an electric motor operated on an AC system with a squirrel-cage rotor for driving a circular saw with a blanking controller which connects the AC voltage intermittently to the motor as shown in German Patent DE 41 30 532A1. In this known circuit arrangement, the aim is to reduce the power consumption under specific operating condutions, such as during idling, in order to maintain the rotational speed corresponding to full operation. On the other hand, it is also possible to provide a reduction in rotational speed and torque in order to reduce the power consumption in partial-load operation. Such a blanking controller does not come into consideration from the point of view of power reduction for electric tools used in manual operation because the centrifugal masses are too small for continuous operation. Furthermore, a squirrel-cage induction motor cannot output a useful torque up to the point of standstill.

It is recommended in the specialist literature in the case of the use of blanking control, which is also termed burst-firing control, in conjunction with electric motors to compensate the fluctuations in rotational speed or torque by an additional centrifugal mass. A reference covering this application may be found in DE-Z Der Elektromeister +Deutsches Elektrohandwerk, 1973, Vol. 48, Issue 18, pages 1269, 1270. According to this reference, a burst-firing controller is understood to be a circuit arrangement in which the complete voltage and frequency are continually periodically applied to the relevant apparatus, such as the electric motor, and the apparatus is respectively separated from the system between applications of complete voltage and frequency. It goes without saying that a pulsating torque which is undesired per se is obtained in accordance with the periodic starting and stopping operations in the case of an electric motor. Thus, with electric tools phase-gating control has been used exclusively to date in order to achieve a torque characteristic which is as uniform as possible in conjunction with the use of each half wave of the feeding AC voltage during operation.

OBJECTS AND SUMMARY OF INVENTION

It is a primary object of the present invention to provide an electric screwdriver which can be operated with a variable continuous rotational speed and also with a variable, jerky, or pulsing, rotational speed and a correspondingly pulsing torque.

Another object of the present invention is to provide an electric screwdriver which counteracts the ejection forces present during operation of a conventional electric screwdriver.

Yet another object of the present invention is to provide an electric screwdriver which produces a pulsed torque in the form of clocked torque pulses and rotational delays or interruptions in rotation.

The foregoing and other objects and advantages of the present invention will appear more clearly hereinafter.

In accordance with the present invention there is provided an electric screwdriver in which a universal motor is driven by means of a phase-gating controller for determining variable rotational speeds. The phase-gating controller can be switched over to wave-packet-controlled phase-gating control and the universal motor can be adjusted in operation by the wave-packet controller to a jerky rotational speed up to the point of motor stand-still.

The phase-gating controller has a triac with an integrated circuit (IC) as the starting device and the IC is connected to an oscillator whose output is connected to the enable terminal of the phase-gating controller IC. The oscillator output may alternatively be connected to influence the trigger pulse for driving the triac.

The oscillator includes two actuators. The first actuator determines the drive frequency of the enabling device of the phase-gating IC. The second actuator determines the pulse width of the frequency. The frequency of the oscillator can be adjusted from 5 to 50 Hz and the pulse width of the frequency can be adjusted between 1% and 99%.

The present invention enables the counteracting of the ejection forces during the screwing operation and facilitates driving home building screws or the like, flush in a uniform fashion. The effective screwing forces are applied by a pulsed torque. In the apparatus according to the present invention, clocked pulses are produced in the form of rotational delays as far as interruptions in rotation.

With reference to electric screwdriver operation, it is advantageous to operate with an alternating torque which increases and decreases. The present invention provides an electric screwdriver which can be operated both with a variable, continuous rotational speed and with a variable, jerky or pulsing rotational speed and a correspondingly pulsing torque. As a result of the variable phase-gating control, the rotational speed and torque remain adjustable in the usual way while, as a result of the variable wave-packet-controlled phase-gating control, that is to say owing to the wave-packet control in conjunction with the phase-gating control, it is possible for screwing forces which fluctuate in one direction to be applied which are caused by pulses which occur in step and take the form of delays in rotation as far as the sticking point and of the rotational speeds rising again. The centrifugal forces occurring, which in the case of screwing at constant rotational speeds, entail a tendency of the screwdriver to be ejected, are counteracted. Consequently, in the case of operation with wave-packet control, the interruptions in rotation or delays in rotation respectively mean that the screwdriver is placed again into the driving depressions of the screw head with a renewed flow of power, and this produces optimum screwing results for the user which cost less effort.

Wave-packet control can advantageously be applied in the case of screwing work where much force is expended, such as in the case of screws which are difficult to release or difficult to drive home, since owing to the wave-packet control, which can be adjusted variably as far as motor standstill, the maximum torque of the motor is applied to the screwdriver when the rotational speed is re-accelerated.

BRIEF DESCRIPTION OF THE DRAWINGS

Other important objects and advantages of the present invention will be apparent from the following detailed description of the invention, taken in conjunction with accompanying drawings in which:

FIG. 4 is a typical waveform produced by the wave packet controlled phase-gating control.

DETAILED DESCRIPTION OF THE INVENTION

Figure 1:
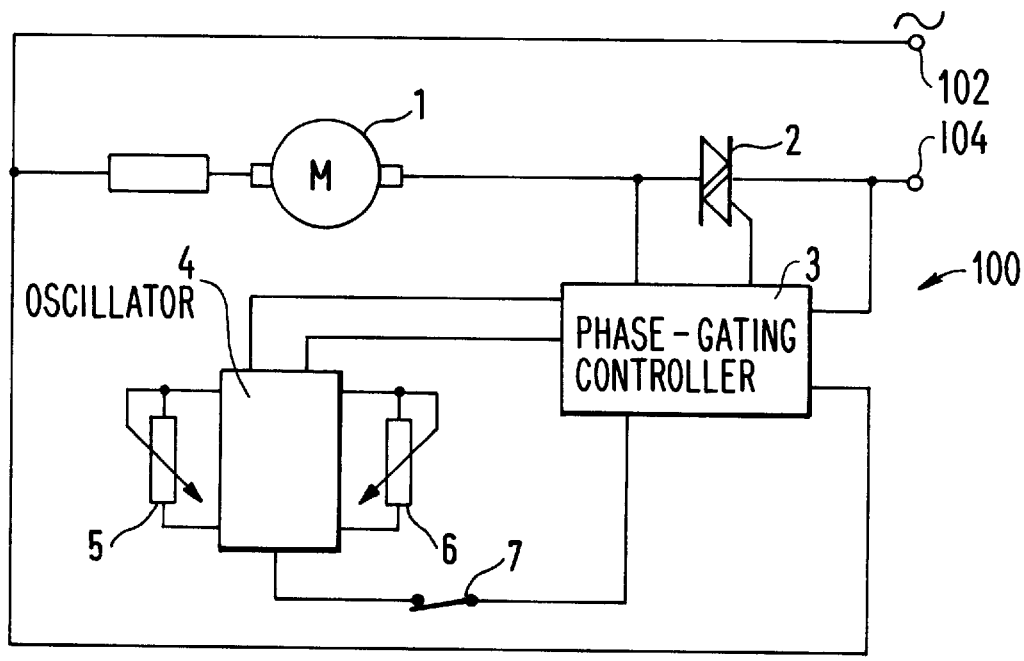
FIG. 1 is a schematic drawing of an electric screwdriver made in accordance with the present invention showing a first embodiment of the invention.
Figure 2:
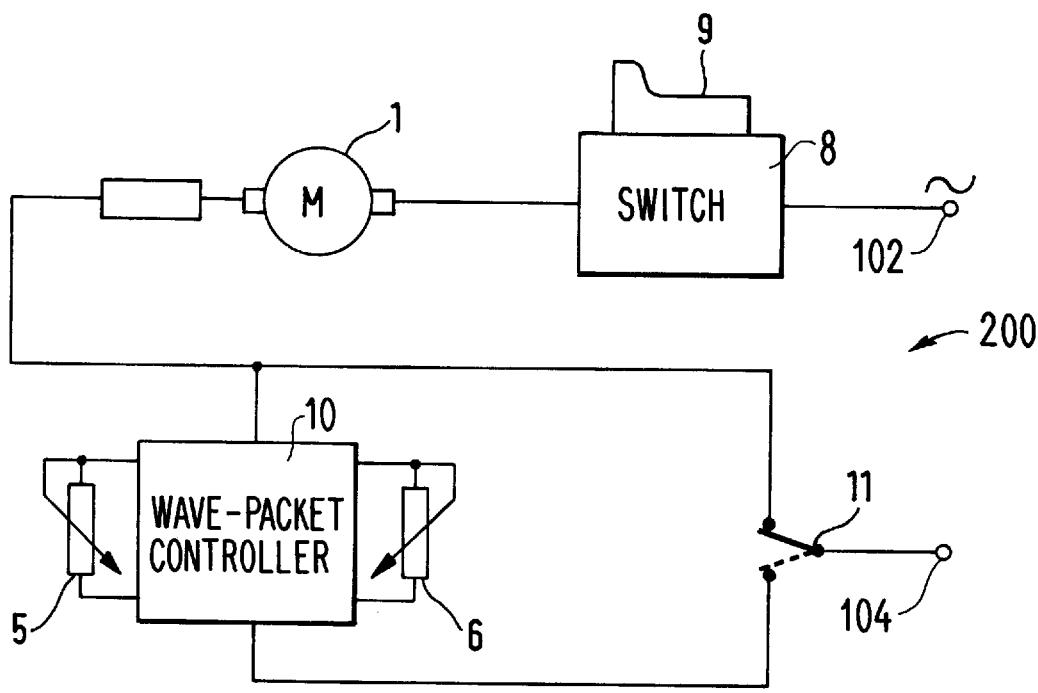
FIG. 2 is a schematic drawing similar to FIG. 1, showing a second embodiment of the invention.
Figure 3:
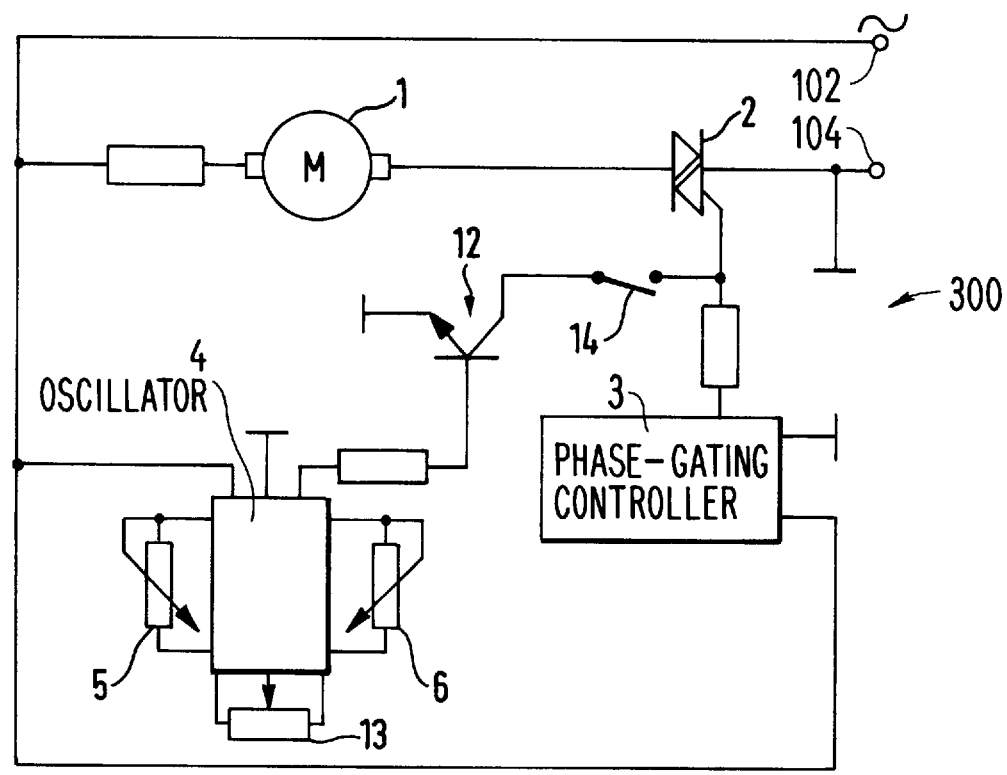
FIG. 3 is a schematic drawing similar to FIG. 1, showing a third embodiment of the invention.

With reference to the drawings, wherein like reference numbers designate like or corresponding parts throughout, there is shown in FIGS. 1–3 an electric screwdriver, made in accordance with the present invention.

FIG. 1 shows a first embodiment of an electric screwdriver 100 made in accordance with the present invention. Prior art electric screwdrivers typically incorporate an electronic system for controlling rotational speed such as a phase-gating controller. In accordance with the present invention, and as will be presently described, a wave-packet control mode of operation is superimposed on the phase-gating controller and the operation of the phase-gating controller can be switched over to a wave-packet controlled phase-gating control mode.

As is shown in FIG. 1, the electric screwdriver 100 includes a commutator motor 1 which is preferably a universal motor. Connected in series with the motor 1 is a triac 2 to which a phase-gating controller 3 is connected. The phase-gating controller 3 contains a solid-state integrated circuit including a phase-gating integrated circuit (IC) chip as the starting and driving device for the triac 2. This phase-gating integrated circuit chip IC is not illustrated, but is contained within the rectangular block designated by the reference numeral 3. This starting device has an enable terminal for the output of the gating pulses. Connected to the phase-gating IC is an oscillator 4 whose output is connected to the enable terminal of the phase-gating IC. The oscillator 4 is connected to two actuators 5, 6. Actuator 5 determines the drive frequency of the enabling device of the IC. Actuator 6 can determine the pulse width of the frequency. The frequency of the oscillator 4 can advantageously be adjusted from a value in the order of 5 Hz to a value in the order of 50 Hz. The pulse width of the frequency may be varied from a value in the order of 1% to a value in the order of 99%.

There is a switching device 7 for determining the operating mode of the phase-gating controller 3 in the connection from the oscillator output to the enable terminal of the phase-gating IC. The closed switch position of the switching device 7 corresponds to the wave-packet-controlled phase-gating control mode for the motor 1. If the switching device 7 is opened, the motor 1 is operated using the customary phase-gating control.

The action of the wave-packet-controlled phase-gating controller is such that not all half waves of the mains 102, 104 are passed at an oscillator frequency below 50 Hz. The further the frequency is below 50 Hz, the fewer half waves are passed. The number of the half waves which are sequentially passed and sequentially not passed is determined by the pulse width of the frequency.

The wave packet controlled phase-gating control enables the power to the motor to be repetitively switched on for a period of time and the switched off for a period of time.

FIG. 4 shows a typical voltage wave form produced by the wave packet controlled phase-gating control. In FIG. 4 the switched "on" duration is shown by the letter E, and the switched "off" duration is shown by the letter A. The sum of the switched "on" duration E, and the switched "off" duration A is designated as the switching interval and is shown by the letter "T".

FIG. 2 shows a second embodiment of the invention 200 including a circuit arrangement in which the wave-packet controller is constructed separately from the phase-gating controller and is connected separately to the phase-gating controller.

It is usual in the case of electric screwdrivers to provide the circuit arrangement for phase-gating control completely in a mains switch 8, and so the operating element 9 of the mains switch 8 can be used to switch the mains 102, 104 and to determine the rotational speed of the motor 1 in a stepless fashion.

The wave-packet controller 10 in the second embodiment of the invention 200 contains a triac. It is possible here to choose between wave-packet-controlled phase-gating control and the standard phase-gating control by means of a changeover element 11 or switch arranged in the connecting line of the mains 104 leading directly to the motor 1. The mode in which the wave-packet-controlled phase-gating controller functions and operates is the same as was previously described with reference to FIG. 1.

FIG. 3 shows a third embodiment of the invention 300 including a circuit arrangement which circumvents the wiring of the phase-gating controller 3 by virtue of the fact that here the trigger pulses for driving the triac 2 are derived or enabled via a switching device 12. The wave-packet controller 4 can be adjusted in a stepless fashion and/or switched on and off via a potentiometer 13 and/or a switch 14.

In general, the phase-gating controller and/or the oscillator 4 can be implemented in an analog manner incorporating analog components as well as digitally in the form of a microprocessor.

The foregoing specific embodiments of the present invention as set forth in the specification herein are for illustrative purposes only. Various deviations and modifications can be made within the spirit and scope of this invention, without departing from the main theme thereof.

I claim:

1. An electric screwdriver comprising:

a universal motor;

phase-gating controller means;

first connection means connecting said phase-gating controller means and said universal motor;

wave-packet controller means; and second connection means connecting said wave-packet controller means and said phase-gating controller means.

2. An electric screwdriver according to claim 1, in which said wave-packet controller means further comprises a triac.

3. An electric screwdriver according to claim 1, further comprising:

electrical connection means disposed connecting said universal motor to a source of electrical power;

switch means, disposed in said electrical connection means, with said switch means connected to said phase-gating controller means and connected to said wave-packet controller means for the purpose of choosing between wave-packet controlled phase-gating control and pure phase-gating control operation.

4. An electric screwdriver comprising:

a universal motor; and phase-gating controller means for determining variable rotational speed of said universal motor, with said phase-gating controller means capable of a wave-packet controlled phase-gating control mode and with said wave-packet controlled phase-gating control mode capable of controlling said universal motor for a jerky rotational speed in a range of speed which extends to the point of standstill.

5. An electric screwdriver according to claim 4, in which said phase-gating controller means comprises:

a triac;

integrated circuit means with said integrated circuit means connected to said triac for the purpose of starting said triac, with said integrated circuit means having an enable terminal;

oscillator means, with said oscillator means having oscillator output means, with said oscillator output means connected to said enable terminal of said integrated circuit means.

6. An electric screwdriver according to claim 5, in which said triac further comprises gate means and with said oscillator means connected to said gate means of said triac.

7. An electric screwdriver according to claim 4, wherein said phase-gating controller means comprises analog phase-gating controller means.

8. An electric screwdriver according to claim 4, wherein said phase-gating controller means comprises digital phase-gating controller means.

9. An electric screwdriver according to claim 4, wherein said phase-gating controller means comprises analog phase-gating controller means.

10. An electric screwdriver comprising:

a universal motor; and phase-gating controller means for determining variable rotational speed of said universal motor, with said phase-gating controller means capable of a wave-packet controlled phase-gating control mode and with said wave-packet controlled phase-gating control mode capable of controlling said universal motor for a jerky rotational speed;

with said phase-gating controller means comprising:

a triac;

integrated circuit means with said integrated circuit means connected to said triac for the purpose of starting said triac, with said integrated circuit means having an enable terminal;

oscillator means, with said oscillator means having oscillator output means, with said oscillator output means connected to said enable terminal of said integrated circuit means; said oscillator means comprising;

a first actuator means; and a second actuator means with said first actuator means determining the drive frequency of said integrated circuit means in said phase-gating controller means and with said second actuator means determining the pulse width of the drive frequency of said integrated circuit means in said phase-gating controller means.

11. An electric screwdriver according to claim 10, in which said oscillator means comprises adjustable oscillator means with said adjustable oscillator means capable of adjustment in a frequency range extending from a frequency in the order of 5 Hz to a frequency in the order of 50 Hz and in a pulse width range extending from a pulse width in the order of 10% to a pulse width in the order of 80%.

12. An electric screwdriver according to claim 11, further comprising:

switch means for reversibly switching the operating mode of said phase-gating controller means, with said switch means connected between said oscillator output means and said enable terminal of said integrated circuit means in said phase-gating controller means.

13. An electric screwdriver according to claim 10, in which said oscillator means comprises adjustable oscillator means with said adjustable oscillator means capable of adjustment in a frequency range extending from a frequency in the order of 5 Hz to a frequency in the order of 50 Hz and in a pulse width range extending from a pulse width in the order of 1% to a pulse width in the order of 99%.

* * * * *